United States Patent [19]

Onoe et al.

[11] Patent Number: 5,151,693

[45] Date of Patent: Sep. 29, 1992

[54] WIRELESS SIGNAL TRANSMISSION SYSTEM WITH RANDOM ACCESS

[75] Inventors: Seizo Onoe; Narumi Umeda, both of Yokohoma, Japan

[73] Assignee: Nippon Telegraph and Telephone Corporation, Tokyo, Japan

[21] Appl. No.: 584,264

[22] Filed: Sep. 18, 1990

[30] Foreign Application Priority Data

Sep. 19, 1989 [JP] Japan .................................. 1-240822

[51] Int. Cl.⁵ .............................................. H04B 7/00
[52] U.S. Cl. ............................ 340/825.3; 340/825.54
[58] Field of Search ...................... 340/825.06, 825.07, 340/825.08, 825.3, 825.34; 371/33, 37.7, 38.1, 34, 67.1; 455/31, 32, 33, 34, 38, 53, 54, 56, 69, 89

[56] References Cited

U.S. PATENT DOCUMENTS

| | | | |
|---|---|---|---|
| 4,383,257 | 5/1983 | Giallanza et al. | 455/38 |
| 4,477,809 | 10/1984 | Bose | 340/825.07 |
| 4,519,068 | 5/1985 | Krebs et al. | 455/56 |
| 4,862,461 | 8/1989 | Blaner | 371/33 |
| 4,940,974 | 7/1990 | Sojka | 340/825.08 |

Primary Examiner—Donald J. Yusko
Assistant Examiner—Dervis Magistre
Attorney, Agent, or Firm—Frishauf, Holtz, Goodman & Woodward

[57] ABSTRACT

A central station generates and transmitted data of a transmission format. The transmission format includes an I/B bit indicating permission or inhibition of a new transmission of a next transmission timing of terminal stations, an R/N bit indicating reception or non-reception of a signal at the central station, and partial data produced from data received at the central station in accordance with a predetermined rule. One or plural of the terminal stations transmit the signal containing signal-length data W to the central station. The terminal station starts new transmission when the I/B bit indicates the permission of transmission. The central station determines and transmits the I/B bit, the R/N bit, and the partial data in accordance with the reception of the signal-length data W and the data transmitted from the terminal station. The terminal station determines whether or not a signal has been correctly received at the central station, in accordance with the R/N bit and the partial data. The terminal station suspends the transmission of signals for a predetermined period of time, when it is determined that the signal has not been correctly received at the central station.

4 Claims, 4 Drawing Sheets

5,151,693

WIRELESS SIGNAL TRANSMISSION SYSTEM WITH RANDOM ACCESS

BACKGROUND OF THE INVENTION

1. Field of the Invention

The present invention generally relates to a wireless signal transmission system, and particularly to a wireless signal transmission system in which a plurality of terminal stations make access to a central station at random, thereby to transmit signals thereto.

2. Description of the Related Art

The slotted ALOHA system and the ICMA (Idle Signal Casting Multiple Access) system are known, in which a plurality of terminal stations access the central station at random. The ICMA system is particularly advantageous, if a long signal is to be transmitted.

However, when the LAPB (described later) or specific layer-2 procedure of protocol such as extended LAPB is employed in these conventional communication systems, the systems will have a very low transmission efficiency. This is because signal transmission though the upward links is limited due to signal collision, though data transmission through the upward links needs to be balanced with the data transmission through the downward links.

To obtain a good throughput characteristic of a random access system, signals are transmitted through the upward links to such extent that the signal collision rate exceeds, for example, 0.2, and the reliability of the system is ensured by re-transmitting the signals.

The LAPB is equivalent to the balanced HDLC (high level data link control) transmission system. The word "balanced" means that a transmission terminal and a reception terminal are on an equal footing.

In the HDLC system, a transmitting station transmits a signal including 16-bit check codes to a receiving station. If the receiving station detects an error in the signal, it output a re-transmission request to the transmitting station, requesting that the transmitting station re-transmit the signal. More specifically, re-transmission control is performed, wherein the transmitting station re-transmits the message, and the receiving station supplies, upon receipt of the re-transmitted message, a layer-2 acknowledge signal to the transmitting station, thus acknowledging the receipt of the message. The reliability of the HDLC system is thereby ensured.

FIG. 6 shows a signal structure according to the conventional LAPB format. As is shown in this figure, a signal to be transmitted contains a frame synchronizing flag F, a control code C, transmission data D, and a check code CRC. The check code CRC is comprised of bits and obtained by a specific generation polynomial equation. The check code CRC is added to data (C+D). The receiving station detects an error in the data (C+D+CRC) received, and transmits a control code C to the transmission terminal, informing whether or not the signal has been correctly received. If NO, the transmitting station re-transmits the signal to the receiving station.

When the above-described communication procedure is applied to random access in a mobile digital communication, especially when the central station transmits a massage through a downward link to a terminal station, and the terminal station transmits, upon receipt of the message, a layer-2 acknowledge signal through the upward link at random the central station, the acknowledge signal collides another signal in another upward link at high probability. Consequently, the signal may not reach the central station.

If the the central station does not receive the signal within a predetermined period of time, it re-transmits the massage to the terminal station through the downward link. Obviously, this results in a low transmission efficiency and a great transmission delay, particularly when the message is long.

SUMMARY OF THE INVENTION

It is, therefore, an object of the present invention to provide a new and improved wireless signal transmission system with random access, in which an effective data transmission is achieved by use of the LAPB or layer-2 procedure of a protocol as an extended LAPB, and general-purpose data transmission is achieved by use of the known layer-2 procedure or the extended layer-2 procedure.

To achieve the object, a central station generates data in accordance with a predetermined rule based on a signal transmitted from a terminal station. (This data includes, for example, part of the signal, an identification number of the terminal station, or the results of the predetermined logical operation using the data and the identification number.) The central station transmits the data to the terminal station. The terminal station compares this data with data which is generated in accordance with the same rule as the predetermined rule at the central station, based on data restored in the terminal station, determines whether or not the central station has correctly received the signal from the terminal station. If NO, the terminal station suspends the signal transmission for a predetermined period of time.

According to a first aspect of the invention, there is provided a digital wireless communication method for transferring data between a plurality of terminal stations and a central station with random access, the method comprising the steps of: generating and transmitting, in the central station, data in accordance with a predetermined rule based on a signal transmitted from one of the terminal stations; comparing, in the one terminal station which have been transmitted the signal the data from the central station with data restored in the one of terminal stations, after the original transmission starting; determining whether or not the central station has correctly received the signal from the one terminal station; and suspending transmission of signals from the one of the terminal stations, for a predetermined period of time if the resultant by the determining step is not correct.

According to a second aspect of the invention, there is provided a mobile digital communication method for transferring data between a plurality of terminal stations and a central station, the method comprising the steps of: preparing and transmitting, in the central station, data of a transmission format including an I/B bit indicating permission or inhibition of a new transmission at a next transmission timing of the terminal stations, an R/N bit indicating reception or non-reception of signals from the terminal stations at the central station, and partial data produced from data received at the central station in accordance with a predetermined rule based on the signals which the central station received from the terminal stations; preparing signal-length data W to the transmission format in the terminal stations, the signal-length data W representing the length of a signal to be transmitted from each terminal station; starting the new transmission of the signal or signals containing the signal-length data W, from one or plural of the terminal stations to the central station when the I/B bit indicates the permission of the new transmission; determining and transmitting, in the central device, the I/B bit, the R/N bit, and the partial data in accordance with the reception of the signal-length data W and the signal transmitted from one of the terminal stations; determining, in the one or plural of the terminal stations which have been transmitted, whether or not the signal has been correctly received at the central station, in accordance with the R/N bit and the partial data from the central station; and suspending transmission of signals from the one or plural of the terminal stations, for a predetermined period of time, when it is determined that the signal has not been correctly received at the central station.

According to a third aspect of the invention, there is provided a mobile digital communication system for transferring data, in random access, between a plurality of terminal stations and a central station, the system comprising the steps of: means for preparing and transferring, in the central station, data of a transmission format including an I/B bit indicating permission or inhibition of a new transmission of a next transmission timing of the terminal stations, an R/N bit indicating reception or non-reception of signals from the terminal stations at the central station, and partial data produced from data received at the central station in accordance with a predetermined rule based on the signals which the central station received from the terminal stations; means for preparing signal-length data W to the transmission format in the terminal stations, the signal-length data W representing the length of a signal to be transmitted from each terminal station; means for starting the new transmission of the signal or signals containing the signal-length data W, from one or plural of the terminal stations to the central station, when the I/B bit indicates the permission of the new transmission; means for determining and transmitting, in the central station, the I/B bit, the R/N bit, and the partial data in accordance with the reception of the signal-length data W and the signal transmitted from one of the terminal stations; means for determining, in the one or plural of the terminal station which have been transmitted, whether or not a signal has been correctly received at the central station, in accordance with the R/N bit and the partial data; and means for suspending transmission of signals from the one or plural of the terminal stations, for a predetermined period of time, when it is determined that the signal has not been correctly received at the central station.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended.

BRIEF DESCRIPTION OF THE DRAWINGS

The accompanying drawings, which are incorporated in and constitute a part of the specification, illustrate presently preferred embodiment of the invention and, together with the general description of the preferred embodiment given below, serve to explain the principles of the invention.

DETAILED DESCRIPTION OF THE PREFERRED EMBODIMENT

Figure 1:
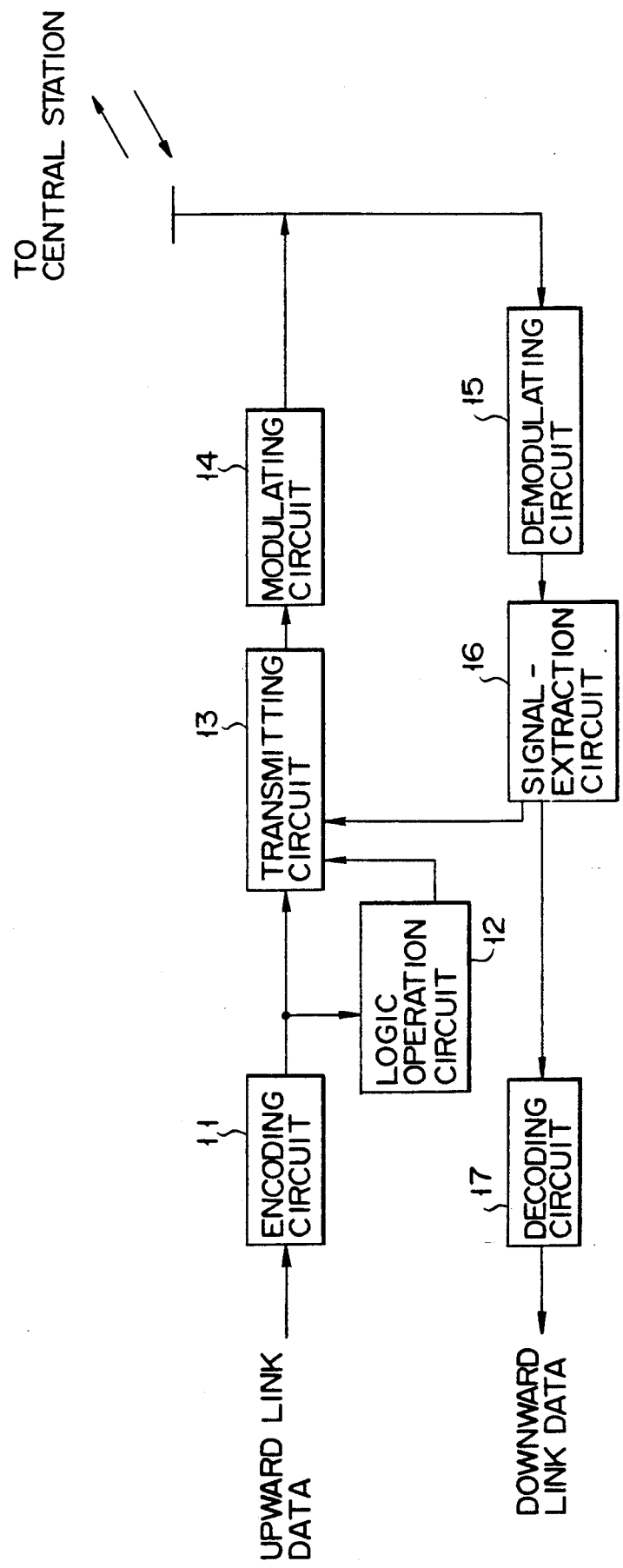
FIG. 1 is a diagram illustrating a terminal station incorporated in a system according to the present invention.

Reference will now be made in detail to the presently preferred embodiment of the invention as illustrated in the accompanying drawings, in which like reference characters designate like or corresponding parts throughout the several drawings.

FIG. 1 is a block diagram showing one of the terminal stations incorporated in a digital mobile communication system according to this invention. As is shown in FIG. 1, the terminal station comprises an encoding circuit 11, a logic operation circuit 12, a transmitting circuit 13, a modulating circuit 14, a demodulating circuit 15, an signal extraction circuit 16, and a decoding circuit 17.

Figure 2:
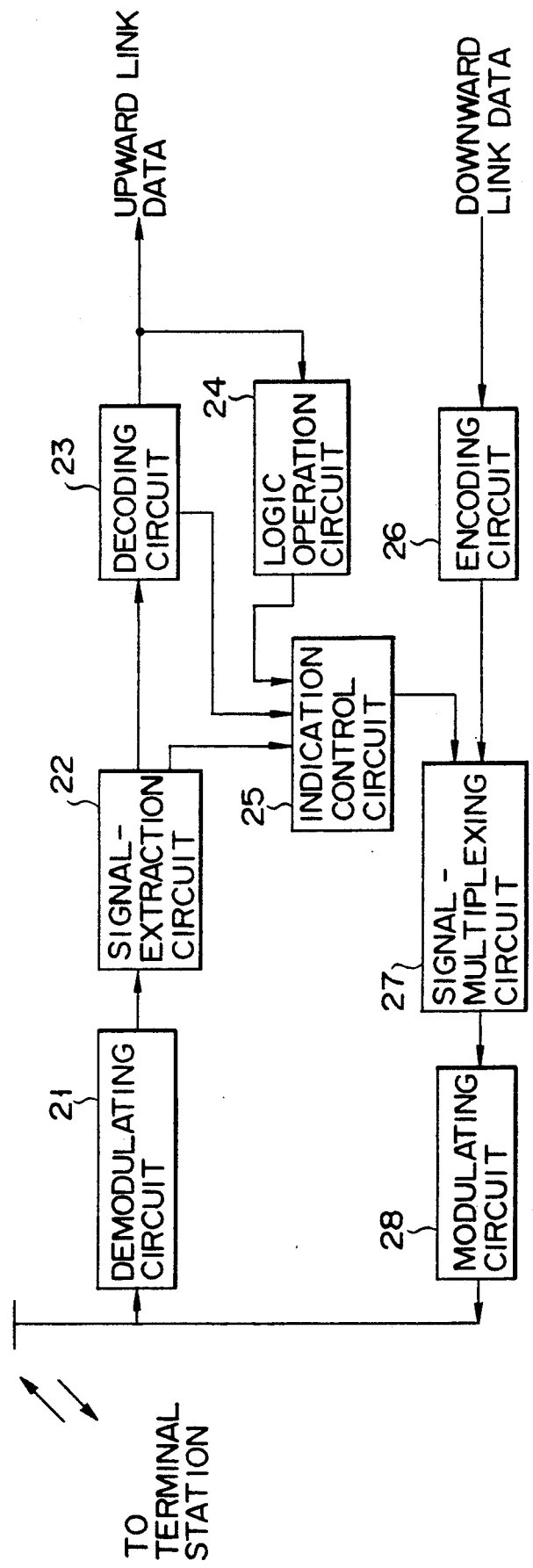
FIG. 2 is a diagram showing the central station incorporated in the system according to the present invention.

FIG. 2 is a block diagram illustrating the central station of the digital mobile communications system. As is shown in FIG. 2, the central station comprises a demodulating circuit 21, a signal extraction circuit 22, a decoding circuit 23, a logic operation circuit 24, an indication control circuit 25, an encoding circuit 26, a signal-multiplexing circuit 27, and a modulating circuit 28.

Figure 3:
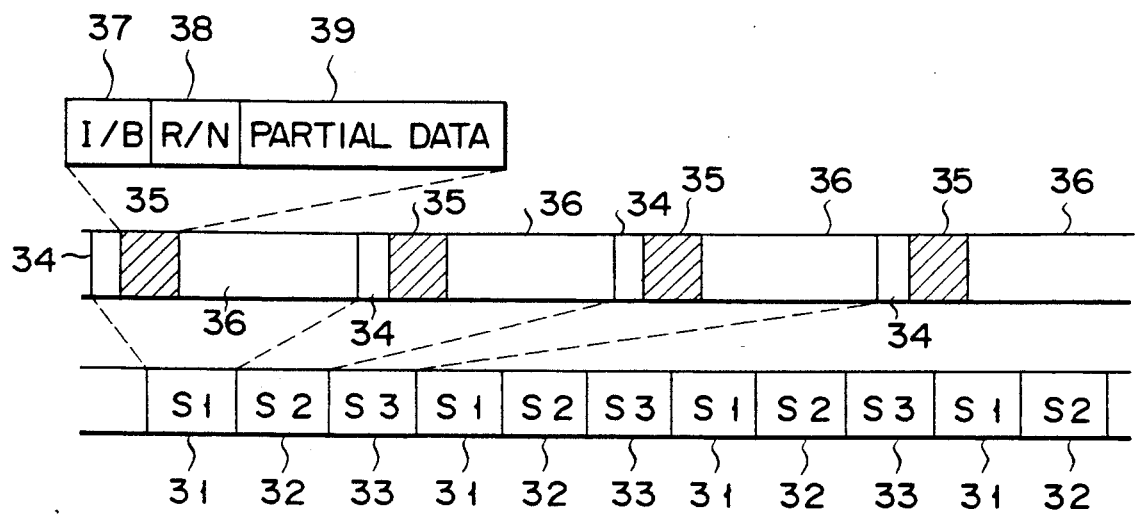
FIG. 3 is a diagram representing the format of a signal transmitted through the downward link of the system.

FIG. 3 illustrates the format of a signal transmitted through the downward link of the system. As this figure shows, the signal consists of units, each comprised of a first slot (S1) 31, a second slot (S2) 32, and a third slot (S3) 33. Each slot has a frame synchronization word 34, an indication signal 35, and data 36. To perform error control, check bits (not shown) are set at the end of the signal format. Each indication signal 35 consists of data 37 pertaining to permission for a new transmission of the terminal station at a next transmission timing of the terminal station, and part of the signal transferred from the terminal station. The data 37 is "I" to permit the transmission of a signal it is "B" to inhibit the transmission of the signal. The data 38 is "R" to inform the correctly reception of a signal; it is "N" to inform the incorrectly reception or non-reception of the signal. There are several techniques available for generating the partial data 39, which will be described later.

Figure 4:
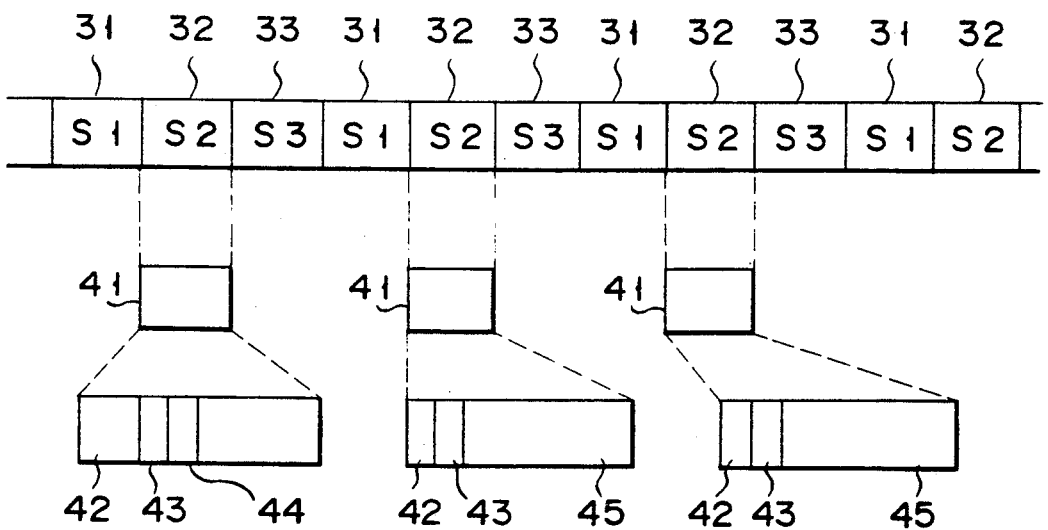
FIG. 4 is a diagram representing the format of a signal transmitted through the upward link of the system.

FIG. 4 represents the format of a signal transmitted through the upward link of the system according to the embodiment of the invention. As this figure shows, the signal consists of units, each comprised of a first slot (S1) 31, a second slot (S2) 32, and a third slot (S3) 33. Also shown in FIG. 4 are upward link burst signals 41 contained in specific slots, i.e., the second slots S2. Each upward link burst signal consists of a synchronization signal 42, a frame synchronizing signal 43, and upward link data 45. The signal 41, shown leftmost in FIG. 4, contains data 44 (typically the signal length W of a transmitting signal) pertaining to the structure of a message. When the data to be transmitted contains a plurality of slots, the number of these slots is loaded in the first slot. The check bits for error control are usually allocated at the end of the signal format. As is shown in FIG. 3, the signal format according to this embodiment is a sequence of slots of various kinds, and random access control which provides for the I/B data is utilized for each slot.

More specifically, the upward link data is divided into a plurality of bursts for transmission in a number required by the length of the message. The first burst contains, as shown in FIG. 4, data 44 pertaining to the structure of the message and also the number of bursts constituting that message. The down I/B data 37 indicates wither transmission permitted or transmission inhibited, in accordance with the number of the bursts W, thereby protecting a signal being transmitted from one terminal station against collision with signals being transmitted from the other terminal stations.

In other words, when the central station receives a signal $W = 3$, B is set for the two consecutive slots that are assigned for use by the terminal station. In the example illustrated in FIG. 4, a bit synchronization signal of a second burst is shorter than that of the first burst since the second burst is received after bit synchronization has been established in the first burst and retained, and a large field is provided for the upward link data by omission of the information pertaining to the signal structure. The operations of the terminal station and central station in transmitting an up message according to this embodiment will be described.

To transmit a message from the terminal station through the upward link, the encoding circuit 11 encodes the message, thus forming, for example, error correcting codes. The message is then input to the transmitting circuit 13, so that it can be transmitted to the central station. Partial data resulting from fixed initial processing is input to the transmitting circuit 13 and stored therein. (The partial data is that part (e.g., the first 10 bits or the last 10 bits of the upward information bits) of the upward link data to be transmitted.)

The data is demodulated by the demodulation circuit 15 is supplied to the transmission control circuit 13 after the indication signal 35 (FIG. 3) has been separated by the signal extraction circuit 16. When the I/B data indicates permission (I), transmission is commenced from the first burst in the next slot timing.

The central station receives the burst signal. In this station, the demodulating circuit 21 demodulates the burst signal, and the signal extraction circuit 22 processes the demodulated signal. The data representing the number of the message-constituting bursts contained in the first burst is input to the indication control circuit 25. In the meantime, the decoding circuit 23 decodes the upward link data, thereby correcting errors, etc. The upward link data, thus decoded, is input to the logic operation circuit 24, whereas the partial data resulting from the same processing performed in the logic operation circuit 12 of the terminal station is input to the indication control circuit 25, thus taking out the partial data received.

The decoding circuit 23 detects errors and supplies a signal to the indication control circuit 25, informing whether or not the signal has been received. The indication control circuit 25 sets bits 37, thereby permitting or inhibiting transmission in accordance with the value of W, and also sets bit of the R/N data, thus informing whether or not the signal has been received. If the bit is "R," it indicates that the signal has been received. If the bit is "N," it indicates that the signal has not been received. The partial data so taken out is incorporated into the indication signal 35. The indication signal 35 is transmitted via the signal-multiplexing circuit 27 and modulation circuit 28.

In the terminal station, the indication signal 35 is supplied to the transmitting circuit 13 through the demodulation circuit 15 and the signal extraction circuit 16. If the R/N information 38 output by the signal extraction circuit 16 is "R," indicating the receipt of the transmitted data, the transmitting circuit 13 compares the partial data 39 with that one stored in the logic operation circuit 12 prior to the transmission. If the compared data pieces are identical, the circuit 13 determines that the data transmitted has been correctly received, and transmits the next burst. Alternatively, the circuit 13 stops transmitting the next burst if the message is short and requires only one burst.

When the R/N information 38 indicates non-reception, or when the partial data 39 is not identical to the stored partial data, the transmitting circuit 13 is held in a waiting state for re-transmitting the data from the first burst. Immediately, or upon lapse of a period of time, the circuit 13 starts again to transmit the data when the bit 37 indicates the transmission permitted.

Figures 5, 6:
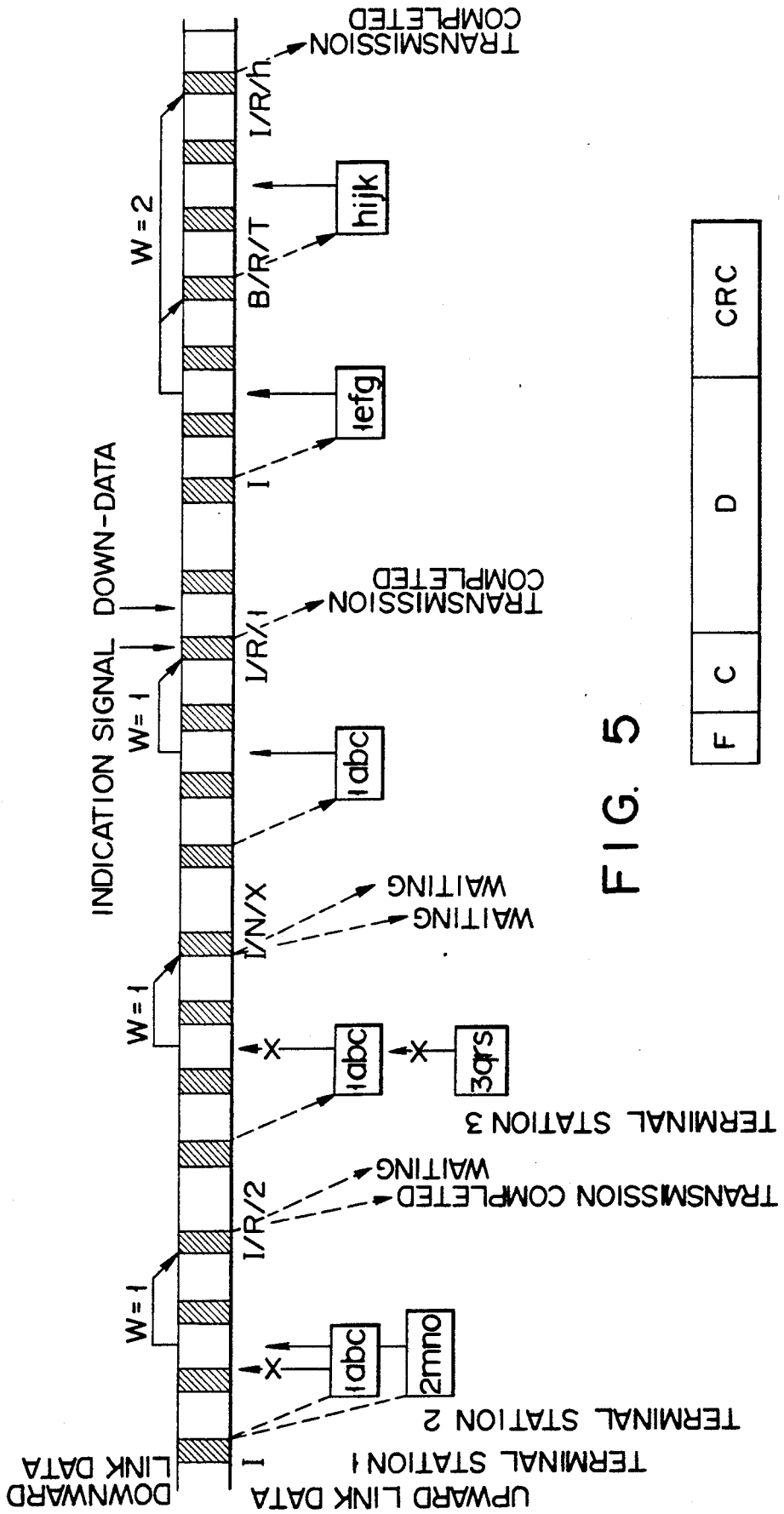
FIG. 5 is a diagram explaining the operation of the system according to the invention.
FIG. 6 is a diagram illustrating the format of a signal transmitted in the conventional LAPB system.

FIG. 5 is a diagram explaining the operation of the system according to the the invention.

Assume that terminal stations 1 and 2 are to transmit a message "1 a b c" of a length $W = 1$ (number of bursts) and a message "2 m n o" of a length $W = 1$, respectively, immediately prior to time A. Let us further assume that the two message signals are simultaneously transmitted at time A in response to instructions of transmission-permitted (I), and a collision occurs between the two message signals. In this case, if the level of the message transmitted from the terminal station 2 is higher than that of the message transmitted from the terminal station 1, the message from the terminal station 2 survives. Since $W = 1$, the central station transmits a signal, in the next slot, to the the surviving terminal station, informing that the transmission has been permitted and that the partial data has been received.

The terminal station 2 then stops transmitting the message since the partial data is identical to the stored one, while the terminal station 1 is held in the waiting state for re-transmission due to non-coincidence. If re-transmission takes place at time B, and the re-transmitted signal collides with a signal from a terminal station 3, and if either signal reaches the terminal station 1, the terminal station 1 is again brought into the waiting state since transmission permitted, non-reception of signal (N), and the receipt of the partial data (X) are notified in the next slot. The terminal section 2 therefore re-transmit data at time C. If the re-transmitted data is correctly received at the central station, the terminal station receives, in the next slot, a signal indicating transmission permitted (I), signal received (R), and partial data received (1). The coincidence of the transmitted data with the stored causes the terminal station 1 to complete transmission of the message "1 a b c".

To transmit a $W = 2$ message "1 e f g h i j k", the terminal station 1 starts transmission upon receipt of the signal indication transmission permitted (I), at time D. Since $W = 2$, it is notified of transmission inhibited (B), signal received (R), and partial data received (1). Since there is a coincidence between both of the partial data, the terminal station 1 transmits a second burst. In the next step, it receives a signal indicative of transmission permitted (I), signal received (R), and partial data received (1), and thus stops the transmitting operation.

Since transmission is effected by utilizing a region of high throughput and automatic re-transmission is effected where the probability of collision is relatively high, the invention provides a high degree of reliability of up signals to permit bi-directional information transmission to be effectively performed by utilizing a fixed layer 2 procedure.

Since re-transmission of data occurring at the time of collision in up random access is achieved without relying on the communications procedure, complex control of the communication procedure is unnecessary, and re-transmission time suitable for random access can be set, so that transmission delay can be advantageously minimized.

When the message is formed of a plurality of bursts, a technique for checking partial data in respect of each burst has been described above. Where it is sufficient to only identify which one of data has been received at the time of collision, only the first burst may be checked, since if the first burst has been correctly received, the data I/B is rendered B in the next burst and no collision occurs with respect to the second and subsequent bursts. The partial data has been explained as being obtaining by performing a logical operation on reproduced data which has been error corrected at the central station. When, however, no independent error correction can be made or when such corrections take much time since error correction has been made over the bit interleave and a plurality of bursts, the partial data may be produced by directly subjecting the received data to logic operation processing without correcting an error.

In this case, when a signal error has been generated, erroneous partial data is returned to the terminal station. This creates no problems since such partial data is treated as non-coincident at the terminal station.

The partial data can be provided by taking out a part of the bit array of the message in 10 bits or so, as described above, but may also be by taking out 10 bits or so from appropriate plural points of the bit array of the upward link data 45 and by adding the bits or Ex-ORing each bit.

Further, the upward link data 45 has a portion that corresponds to the identification number ID of the terminal station, so that partial data may be produced by taking out a part or the whole of the bits in such portion. Still further, operation results of part of the ID and part of the other data may be utilized. If 14 bits are allocated for partial data, a probability for the coincidence of two partial data pieces obtained from two data pieces is $\frac{1}{2}^{14} \approx 10^{-5}$ in the case of a 14-bit partial data, the rate of collision is 0.2, and the probability of survival at the time of collision is 0.5. The probability for a given terminal station to determine erroneously that transmission is completed, despite non-reception at the central station may be kept at a small value of the order of $10^{-6}$. The number of bits for partial data may be determined to meet requirements for this value.

In general, the transmission of down-data is more effective than the random-access transmission of upward link data. Therefore, to assign 30% or so of a down information field to the partial data does not create any particular problem in attaining well balanced bi-directional information transfer.

Comparison of partial data with another one may be effected not only for detecting coincidence of data to the fullest extent, but may utilize a technique allowing an error in one bit or so considering a transmission error. Although allowing an error necessarily increases the probability in which partial data from two different terminals come to be casually coincident with each other, the probability of coincidence that can happen by allowing a one bit error to remain, for example, in a 14 bits partial data is on the order of $10^{-4}$ and is still tolerable.

A technique is valid in which error corrections or majority-vote fashion is utilized for the purpose of this invention to deal with the I/B and R/N information and the partial data.

The foregoing description is limited to the arrangement in which three transmitting slots at the terminal stations are placed one slot after the receiving slot, thus enabling the terminal station to identify the partial data before this station receives the next slot. In the case where the same slot is used in the next cycle in both the transmitting station and the receiving station, the value W can independently decoded in the head portion of the burst, and the signal indicating either transmission permitted or transmission inhibited can be set in the end portion of the burst. Then, the partial data will be transmitted with a delay of one-cycle time.

Although the technique of determining whether or not a signal has been received at the central station has been described by way of detecting an error, the level of the data received or the results of lower-level identification of data can be used for this purpose. Further, the indication of the transmission status has been described as giving information respecting only reception or non-reception, such information may validly include the nature of non-reception (for example, non-reception due to thermal noise when the reception level is low; non-reception due to signal collision when the reception level is high but a coding error exists), so that re-transmission may be instructed depending upon the nature of the error. For example, in the event of non-reception due to thermal noise, immediate re-transmission may be instructed, while in the case of non-reception due to collision, re-transmission may take place after the lapse of a random time delay to avoid re-collision.

The bits 38 (FIG. 3) representing a reception or non-reception of data may occupy a common field with the bits 39 for partial data.

More particularly, partial data is unnecessary in the case of non-reception. Thus, a field formed by combining the bits 38 indicating reception or non-reception and the bits 39 assigned for partial data can be used to express a specific pattern (e.g., all-one bits) in order to show non-reception, and this same field may be used in receiving partial data. When the partial data is identical to a specific pattern, several of the pattern bits may be forcedly processed, such as by inverting the first three bits.

When the number of bits forming the partial data is large, the partial data can still be reproduced from the data merely decoded from the noise, without determining whether or not the data has been received, for example, by omitting the bits representing reception/non-reception of data. Reference to the partial data provides correct judgment on the reception and non-reception of data with high accuracy.

Assigning so many bits to the partial data does not particularly jeopardize a well balanced bi-directional information transmission. But, when a further increase of efficiency of down transmission is particularly desired, a technique may be validly used in which additional bits may be accommodated for indicating whether the data in the field used for the partial data represents downward link data or partial data, such that the bits may notify the presence of the partial data only when this data is necessary and the subsequent bits may be used to transmit downward link data. In random access to the system by a plurality of transmitters and receivers using the same frequency (for example, in a mobile communication system having sectors, each comprising transmitters and receivers and using a specific frequency), it is possible that two or more signals are received simultaneously. In this case, it suffices to supplying partial data items, whereby a very high efficient information transmission is accomplished.

The foregoing description has referred to vacant line control. But the technique of notifying partial data to a pure ALOHA or slotted ALOHA system may be used.

As has been described, regions of high throughput are used in this invention, so that the reliability of up-signals is high in situations where probability of collision is relatively high, with the result that bi-direction data-transmission can be achieved by use of the fixed layer-2 procedure.

Since re-transmission is performed at the time of collision in random access operation, independently of an upper layer, no management more complex than the upper layer is required, and moreover, transmission delays are minimized by setting the re-transmission time at a value suitable for random access.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A digital wireless communication method is which data is transmitted and received by a central station and each of a plurality of terminal stations, said terminal stations being capable of randomly accessing said central station, the method comprising the steps of:

transmitting from said central station a first indication signal for indicating when said terminal stations are enabled to transmit an original data signal to said central station;

transmitting at least a portion of the original data signal from at least one of said terminal stations to said central station when the first indication signal received from said central station indicates that transmission is enabled;

generating another indication signal in said central station, said another indication signal including data generated in accordance with a predetermined rule, based on the at least a portion of the original data signal received from said at least one terminal station, said another indication signal further including at least one of a partial data of the at least a portion of the original data signal and a partially processed data of the at least a portion of the original data signal, said another indication signal further including proper receipt data indicating whether the at least a portion of the original data signal was correctly received by said central station and enabling data for enabling said at least one terminal station to transmit a remaining portion of the original data signal;

transmitting said another indication signal from said central station to said at least one terminal station;

then comparing at said at least one terminal station, data in the received another indication signal with data stored in said at least one terminal station;

determining in said at least one terminal station; using the at least one of the partial data and the partially processed data of the at least a portion of the original data signal and the proper receipt data in said another indication signal, whether said central station correctly received the at least a portion of the original data signal previously transmitted from said at least one terminal station; and suspending transmission of data signals from said at least one terminal station for a predetermined period of time as soon as the determining step determines that the at least a portion of the original data signal transmitted from said at least one terminal station was not correctly received by said central station.

2. The method of claim 11, further comprising:

transmitting the remaining portion of the original data signal to said central station from said at least one terminal station in response to reception by said at least one terminal station of the another indication signal including the enabling data, indicating from the proper receipt data, and the at least one of the partial data and the partially processed data that the at least a portion of the original data signal was correctly received and enabling the at least one terminal station to transmit the remaining portion of the original data signal;

3. A mobile digital communication method in which data is transmitted and received by a central station and each of a plurality of terminal stations, said terminal stations being capable of randomly accessing said central station, the method comprising the steps of:

transmitting from said central station a first indication signal for indicating when said terminal stations are enabled to transmit an original data signal to said central station;

transmitting at least a portion of the original data signal from at least one of said terminal stations to said central station when the received first indication signal from said central station indicates that transmission is enabled, said at least a portion of the original data signal including data indicating a total length of the original data signal which is to be transmitted from the at least one terminal station to the central station;

generating in said central station, in response to the at least a portion of the original data signal received from said at least one terminal station, another indication data signal having a format including a I/B-bit for enabling or prohibiting a transmission of the remaining portion of the original data signal from said at least one terminal station, and an R/N-Bit for indicating whether the at least a portion of the original data signal was correctly received by said central station, said another indication signal further including a partial data signal generated in response to the received at least a portion of the original data signal, transmitted from said at least one terminal station to said central station, said partial data signal being generated in accordance with a predetermined rule based on the at least a portion of the received original data signal transmitted from said at least one terminal station;

said another indication signal generated by the central station further including data indicating that said remaining portion of the original data signal is permitted to be transmitted subsequently to said central station from the at least one terminal station, transmitting said another indication signal to said at least one terminal station;

transmitting the remaining portion of the original data signal from said at least one terminal station to said central station, when the R/N bit indicates that the at least a portion of the original data signal was correctly received by the central station and the I/B-bit in the another indication signal received by said at least one terminal station indicates the enablement of transmission from said at least one terminal station of the remaining portion of the original data signal;

generating in said central station another I/B-bit and another R/N bit and a partial data signal in response to the reception of the remaining portion of the original data signal from said at least one terminal station to thereby form still another indication signal in said central station;

transmitting said still another indication signal to said at least one terminal station;

determining from the still another indication signal transmitted from said central station, at said at least one terminal station which transmitted the remaining portion of the original data signal, whether the remaining portion of the original data signal was correctly received at said central station in accordance with the R/N-bit and the partial data signal included in said still another indication signal transmitted from the central station; and suspending transmission of data signals from said at least one terminal station for a predetermined period of time, as soon as said at least one terminal station determines that at least one of the at least a portion of the original data signal and the remaining portion of the original data signal has not been correctly received at said central station.

4. A mobile digital communication system in which data is transmitted and received by a central station and each of a plurality of terminal stations, said central station and each of said terminal stations respectively having receiving means for receiving data transmitted in the digital communication system, said plurality of terminal stations being capable of randomly accessing said central station, the system comprising:

means for transmitting from said central station a first indication signal for indicating when said terminal stations are enabled to transmit at least a portion of an original data signal to said central station;

transmitting means in at least one of said terminal stations for transmitting the at least a portion of the original data signal to said central station when the received first indication signal from said central station indicates that transmission is enables, said at least a portion of the original data signal including data indicating a total length of the original data signal to be transmitted from the at least one terminal station to said central station;

means for preparing another indication signal in said central station which includes data in a transmission format including an I/B-bit for indicating enablement or prohibition of a subsequent transmission of a remaining portion of the original data signal from said at least one terminal station, an R/N-bit indicating reception or non-reception of the at least a portion of the original data signal from said at least one terminal station at said central station, and a partial data signal generated in accordance with the at least a portion of the original data signal received in said central station, said partial data signal being generated in accordance with a predetermined rule based on the at least a portion of the original data signal which said at least one terminal station transmitted to said central station;

means for transmitting said another indication signal from said central station to said at least one terminal station;

means for preparing said remaining portion of the original data signal to have a signal length W, in a transmission format in said at least one terminal station, wherein the signal length W, represents a predetermined length of at least a portion of said remaining portion of the original data signal to be transmitted from said at least one terminal station to said central station;

said transmitting means in said at least one terminal station additionally transmitting the at least a portion of the remaining portion of the original data signal, having the signal length W, to said central station, when the previously transmitted another indication signal from said central station has a partial data signal and an R/N bit indicating that the at least a portion of the original data signal was correctly received and an I/B-bit permitting the additional transmission from said at least one terminal station;

means for preparing and generating in said central station still another indication signal including a I/B-bit, a R/N-bit and a partial data signal, said partial data signal being generated in accordance with a predetermined rule based on the received at least a portion of the remaining portion of the original data signal, having a signal length W transmitted to said central station from said at least one terminal station;

said transmitting means in said central station transmitting said still another indication signal to said at least one terminal station;

means for determining from said still another indication signal in said at least one terminal station which transmitted the at least a portion of the remaining portion of the original data signal to said central station, whether the at least a portion of the remaining portion of the original data signal was correctly received at said central station, in accordance with the R/N-bit and the partial data signal in said still another indicator signal; and means for suspending transmission of the signals from said at least one terminal station for a predetermined period of time as soon as said at least one terminal station determines that one of the at least a portion of the original data signal and the at least a portion of the remaining portion of the original data signal was not correctly received at said central station.

* * * * *